United States Patent
Canpolat et al.

(10) Patent No.: US 12,507,067 B2
(45) Date of Patent: Dec. 23, 2025

(54) APPARATUS, SYSTEM, AND METHOD OF FEDERATED AUTHENTICATION SERVICE (FAS) FOR WIRELESS COMMUNICATION ROAMING

(71) Applicant: INTEL CORPORATION, Santa Clara, CA (US)

(72) Inventors: Necati Canpolat, Beaverton, OR (US); Seemab Kadri, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 242 days.

(21) Appl. No.: 18/090,300

(22) Filed: Dec. 28, 2022

(65) Prior Publication Data
US 2023/0164554 A1 May 25, 2023

Related U.S. Application Data

(60) Provisional application No. 63/322,782, filed on Mar. 23, 2022.

(51) Int. Cl.
*H04W 12/06* (2021.01)
*H04W 12/30* (2021.01)

(52) U.S. Cl.
CPC ............ *H04W 12/06* (2013.01); *H04W 12/30* (2021.01)

(58) Field of Classification Search
CPC ..... H04W 12/06; H04W 12/08; H04W 12/30; H04W 12/121; H04W 12/084; H04W 12/069
See application file for complete search history.

(56) References Cited

U.S. PATENT DOCUMENTS

| | | | | | |
|---|---|---|---|---|---|
| 7,418,596 | B1* | 8/2008 | Carroll | ............... | H04W 12/04 380/278 |
| 7,443,809 | B2* | 10/2008 | Bajic | .................. | H04W 8/12 370/254 |
| 7,529,203 | B2* | 5/2009 | Bajic | ................. | H04W 28/088 455/445 |
| 7,545,761 | B1* | 6/2009 | Kalbag | ................. | H04L 12/14 455/406 |
| 8,332,914 | B2* | 12/2012 | Buddhikot | ........... | H04L 69/329 726/4 |
| 8,520,609 | B2* | 8/2013 | Singh | .................... | H04L 69/16 370/329 |

(Continued)

*Primary Examiner* — Hosuk Song
(74) *Attorney, Agent, or Firm* — Shichrur & Co.

(57) ABSTRACT

For example, a Federated Authentication Service (FAS) server may be configured to register the FAS server with a wireless communication roaming federation service; to authenticate a user of a mobile device according to a network authentication protocol of the wireless communication roaming federation service, e.g., over a Remote Authentication Dial-In User Service (RADIUS) over Transport Layer Security (RADSec) tunnel between the FAS server and an Access Network Provider (ANP); to identify an Identity Provider (IDP) for the user based on user information for the user received from the ANP via the RADSec tunnel; to trigger user authentication of the user with the IDP for the user via an authentication interface between the FAS server and the IDP for the user; and based on a determination that the user is successfully authenticated with the IDP for the user, to send an authentication success message to the ANP via the RADSec tunnel.

25 Claims, 5 Drawing Sheets

(56) References Cited

U.S. PATENT DOCUMENTS

| | | | |
|---|---|---|---|
| 8,695,082 B2* | 4/2014 | Premec | H04W 12/06 |
| | | | 713/168 |
| 9,775,027 B2* | 9/2017 | Mizikovsky | H04L 63/0892 |
| 12,166,637 B2* | 12/2024 | Zhu | H04L 41/0806 |

* cited by examiner

APPARATUS, SYSTEM, AND METHOD OF FEDERATED AUTHENTICATION SERVICE (FAS) FOR WIRELESS COMMUNICATION ROAMING

CROSS REFERENCE

This application claims the benefit of and priority from U.S. Provisional Patent Application No. 63/322,782 entitled "FEDERATED AUTHENTICATION SERVICE FOR OPENROAMING FRAMEWORK", filed Mar. 23, 2022, the entire disclosure of which is incorporated herein by reference.

TECHNICAL FIELD

Aspects described herein generally relate to a Federated Authentication Service (FAS) for wireless communication roaming.

BACKGROUND

Wireless communication roaming technologies may be configured to support roaming of mobile devices between different wireless communication networks.

For example, as mobile devices move between physical location, some Wi-Fi networks may become unavailable, while other Wi-Fi networks may become available for communication.

For example, the Wireless Broadband Alliance (WBA) OpenRoaming framework may be used for allowing Wi-Fi-enabled devices to join Wi-Fi access networks without the need to re-register and re-enter credentials each time.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
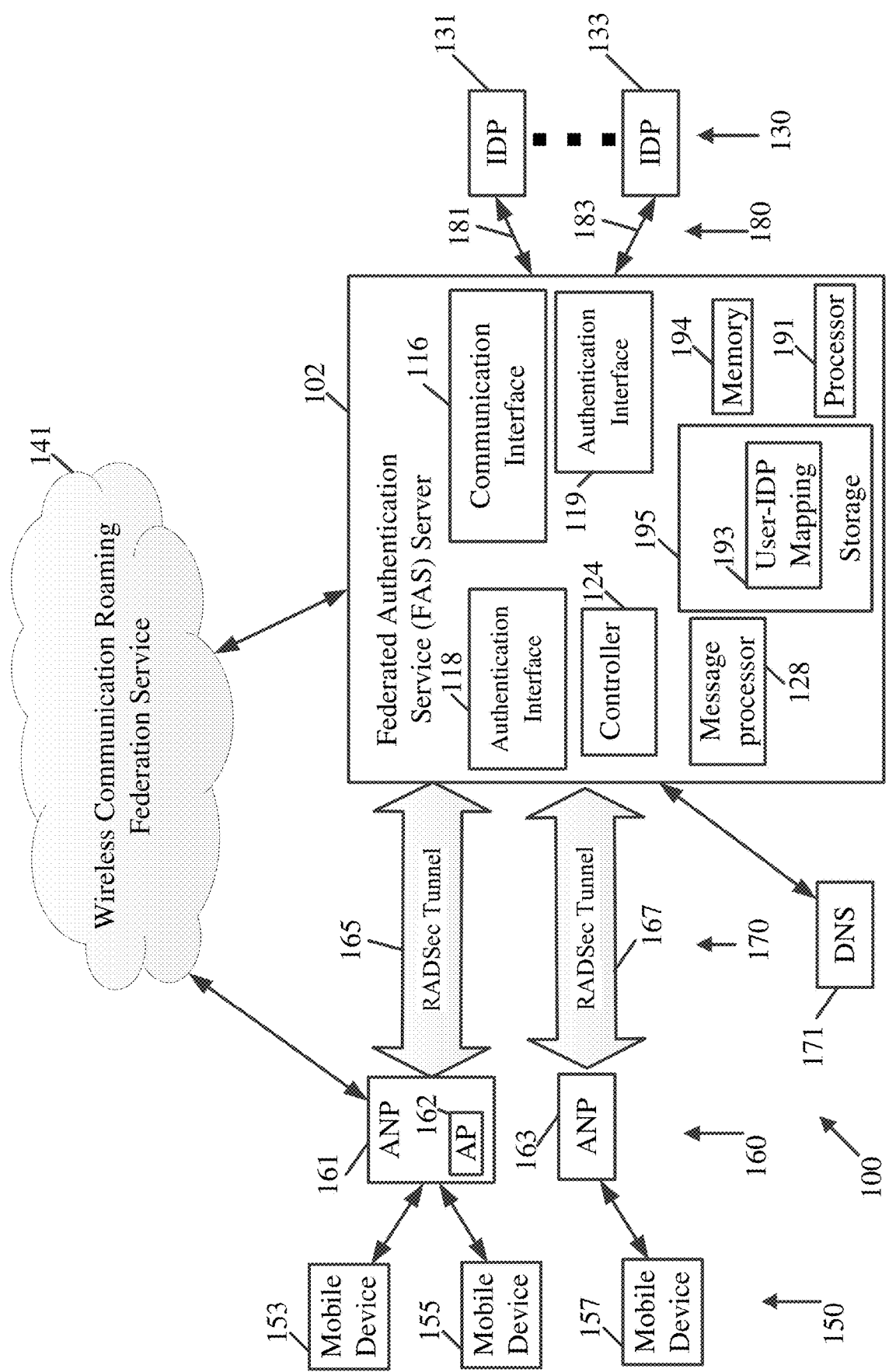
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a server, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (IEEE 802.11-2020, *IEEE Standard for Information Technology—Telecommunications and Information Exchange between Systems Local and Metropolitan Area Networks—Specific Requirements; Part* 11: *Wireless LAN Medium Access Control (MAC) and Physical Layer (PHY) Specifications*, December, 2020)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Reference is made to FIG. 1, which schematically illustrates a system 100, in accordance with some demonstrative aspects.

In some demonstrative aspects, system 100 may include one or more mobile devices 150, e.g., including a mobile device 153, a mobile device 155, and/or a mobile device 157, which may be associated with and/or in communication with one or more Access Network Providers (ANPs) 160, e.g., including an ANP 161 and/or an ANP 163.

In some demonstrative aspects, an ANP of the ANPs 160 may include, for example, an Access Point (AP) 162, which may be configured to provide network access to one or more mobile device 150.

In some demonstrative aspects, an ANP 160 may include, or may be implemented by, an organization and/or entity, which has a Wi-Fi network.

In some demonstrative aspects, ANPs 160 may be configured to provide, manage and/or control network access for the one or more mobile devices 150.

In some demonstrative aspects, ANPs 160 may include Wi-Fi ANPs, which may manage, control, and/or own one or more wireless communication networks, e.g., Wi-Fi networks. For example, ANPs 160 may include enterprises, retailers, facilities, restaurants, coffee-shops, Internet service providers, operators, hospitality and convention centers, airports and/or transportation operators, education facilities, city facilities, government facilities, sport stadiums and/or arenas, corporate offices, public-guest Wi-Fi venues, or the like.

For example, mobile devices 150 may include, for example, a UE, an MD, a STA, a Smartphone, a mobile computer, a laptop computer, an Ultrabook™ computer, a notebook computer, a tablet computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a video source, an audio source, a video sink, an audio sink, a stereo tuner, a broadcast radio receiver, a digital audio player, a speaker, an audio receiver, an audio amplifier, a gaming device, a data source, a data sink, a media player, a music player, a smart device such as, for example, lamps, climate control, car components, household components, appliances, and the like.

In some demonstrative aspects, mobile devices 150 may be capable of communicating content, data, information and/or signals via a wireless medium (WM). In some demonstrative aspects, the wireless medium may include, for example, a radio channel, a cellular channel, an RF channel, a Wi-Fi channel, a 5G channel, an IR channel, a Bluetooth (BT) channel, a Global Navigation Satellite System (GNSS) Channel, and the like.

In some demonstrative aspects, the WM may include one or more wireless communication frequency bands and/or channels. For example, the WM may include one or more channels in a sub-10 Ghz wireless communication frequency band, for example, one or more channels in a 2.4 GHz wireless communication frequency band, one or more channels in a 5 GHz wireless communication frequency band, and/or one or more channels in a 6 GHz wireless communication frequency band. For example, WM 103 may additionally or alternatively include one or more channels in a mmWave wireless communication frequency band. In other aspects, the WM may include any other type of channel over any other frequency band.

In some demonstrative aspects, mobile devices 150 may include, operate as, perform the role of, and/or perform one or more functionalities of, one or more STAs. For example, mobile device 153 may include at least one STA, mobile device 155 may include at least one STA, and/or mobile device 157 may include at least one STA.

In other aspects, mobile devices 150 may include, operate as, perform the role of, and/or perform one or more functionalities of, any other wireless device and/or station, e.g., a WLAN STA, a Wi-Fi STA, and the like.

In some demonstrative aspects, mobile devices 150 may be configured to operate as, perform the role of, and/or perform one or more functionalities of, a non-AP STA.

In other aspects, mobile devices 150 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative aspects, system 100 may be deployed according to a wireless communication roaming federation service framework, e.g., as described below.

In some demonstrative aspects, the wireless communication roaming federation service framework may include a Wireless Broadband Alliance (WBA) OpenRoaming service framework, e.g., as described below.

In other aspects, system 100 may be deployed according to any other suitable wireless communication roaming federation service framework.

In some demonstrative aspects, system 100 may include a wireless communication roaming federation service 141, which may be configured to support a global Wi-Fi network of Wi-Fi networks, for example, to support connection, e.g., automatic and/or secure connection, of mobile devices 150.

In some demonstrative aspects, wireless communication roaming federation service 141 may include a WBA OpenRoaming service, e.g., as described below. In other aspects, wireless communication roaming federation service 141 may include any other type of roaming service.

For example, as mobile devices 150 move between physical locations, some Wi-Fi networks may become unavailable, while other Wi-Fi networks may become available.

For example, as a mobile device 150 leaves a physical area in which one Wi-Fi network is available and enters another physical area in which another Wi-Fi network is available, the mobile device 150 may be presented with the option to join the other Wi-Fi network. This feature of Wi-Fi mobility may lack a cellular concept of "cellular roaming", e.g., where a cellular device which is outside a coverage area of a cellular provider may automatically access another network provided by another cellular provider.

For example, wireless communication roaming federation service 141 may be configured to support Wi-Fi-enabled devices, e.g., mobile devices 150, to join Wi-Fi access networks, for example, even without the need to re-register and re-enter credentials each time a connection with a different Wi-Fi network is to be established.

For example, wireless communication roaming federation service 141 may be configured, e.g., in accordance with the WBA OpenRoaming service framework, to support global federation of public and/or private Wi-Fi networks and identity providers, for example, using WBA Wireless Roaming Intermediary eXchange (WRIX) standards.

In some demonstrative aspects, system 100 may include one or more Identity Providers (IDPs) 130, which may be configured to authenticate end user identities of users of the mobile devices 150.

For example, an IDP 130 may include an entity, which may offer and/or confirm user identities of users of one or more mobile devices 150.

For example, an IDP 130 may be configured to authenticate an end user identity of a user of a mobile device 150, for example, as part of a connection establishment of a connection between the mobile device 150 and an access network controlled by an ANP 160.

In some demonstrative aspects, IDPs 130 may include, for example, mobile operators, cable operators, Internet Service Providers (ISPs), brand-loyalty programs, device-chipset manufacturers, Internet providers, social media providers, public guest Wi-Fi providers, and/or any other type of identity provider.

In some demonstrative aspects, wireless communication roaming federation service 141 may be configured, e.g., in accordance with the WBA OpenRoaming service framework, to support global Wi-Fi roaming around the world, for example, by creating "One Global Wi-Fi Network".

For example, wireless communication roaming federation service 141 may be configured, e.g., in accordance with the WBA OpenRoaming service framework, to support cloud-based federation of ANPs 160 and IDPs 130.

For example, system 100 may be configured according to a wireless communication roaming federation service framework may be configured, e.g., in accordance with the WBA OpenRoaming service framework, which may be based, for example, om a Public Key Infrastructure (PKI) trust model.

For example, ANP and IDP participants, e.g., ANPs 160 and/or IDPs 130, may register and onboard with wireless communication roaming federation service 141, e.g., according to OpenRoaming federation rules. For example, wireless communication roaming federation service 141 may issue the ANP and IDP participants, e.g., ANPs 160 and/or IDPs 130, certificates for future verification and/or authentication.

For example, system 100 may be configured according to a wireless communication roaming federation service framework, which may be configured, e.g., in accordance with the WBA OpenRoaming service framework, to enable dynamic many-to-many relationships among ANPs 160 and IDPs 130.

For example, the IDPs 130 may onboard and register with the wireless communication roaming federation service 141. For example, IDPs 130 may receive from the wireless communication roaming federation service 141 a certificate, which may be utilized by the IDPs 130 to enable customers with suitable credentials, e.g., users of mobile device 150, to connect with many WLAN networks, e.g., millions of Wi-Fi networks around the world.

For example, the ANPs 160 may onboard and register with the wireless communication roaming federation service 141. For example, ANPs 160 may receive from the wireless communication roaming federation service 141 a certificate, which may be utilized by the ANPs 160 to enable WLAN networks, Wi-Fi networks of ANPs 160, to receive many customers, e.g., millions of customers around the world.

In some demonstrative aspects, system 100 may be configured according to a wireless communication roaming federation service framework, which may be configured, e.g., in accordance with the WBA OpenRoaming service framework, to allow substantially any organization that performs user authentication, e.g., social media, enterprises, mobile operators, airlines, and/or OEMs, to potentially join the OpenRoaming framework.

In some demonstrative aspects, system 100 may be configured to provide a technical solution to support onboarding of IDPs 130 with the wireless communication roaming federation service 141, for example, even in case that an IDP 130 is not compatible with authentication mechanisms utilized by the wireless communication roaming federation service framework, e.g., as described below.

In some demonstrative aspects, for example, in some deployments, use cases and/or scenarios, the wireless communication roaming federation service 141 may utilize a framework, which may be based on an authentication mechanism, which may not be supported by some IDPs 130.

For example, the WBA OpenRoaming service framework may define an OpenRoaming authentication procedure, which may be based on an Extensible Authentication Protocol (EAP) mechanism.

For example, the WBA OpenRoaming service framework may define an OpenRoaming authentication procedure, which may be based on an Institute of Electrical and Electronics Engineers (IEEE) 802.1X EAP (802.1X/EAP) mechanism.

For example, the WBA OpenRoaming service framework may utilize Wi-Fi OpenRoaming authentication, e.g., based on the 802.1x/EAP mechanism, which may be supported by Wi-Fi network operators.

In some demonstrative aspects, for example, in some deployments, use cases and/or scenarios, one or more potential IDPs 130, e.g., many potential IDPs 130, may not support the authentication mechanism defined by the wireless communication roaming federation service 141, e.g., the 802.1X/EAP mechanism.

For example, a requirement from IDPs to support the 802.1X/EAP mechanism may block many potential IDPs, which do not support the 802.1X/EAP mechanism, from joining the WBA OpenRoaming service framework.

For example, there may be a relatively large portion of potential IDPs, which may not support the 802.1X/EAP mechanism, and accordingly, may potentially be excluded from joining the WBA OpenRoaming framework.

For example, a requirement from IDPs to support the 802.1X/EAP mechanism may limit the WBA OpenRoaming service framework to only some types of IDPs, e.g., primarily Wi-Fi network operators, which may be able to join the WBA OpenRoaming framework.

However, there may be many other types of potential IDPs, e.g., social media providers, email providers, loyalty memberships, or the like, which may be able to perform user authentication, e.g., without 802.1x support. These potential IDPs may be blocked from joining the WBA OpenRoaming framework, for example, in case IDPs are required to support the 802.1X/EAP mechanism.

In some demonstrative aspects, system 100 may be configured to provide a technical solution to support IDPs 130 in joining the wireless communication roaming federation service 141, for example, e.g., even for IDPs 130, which do not support the 802.1X/EAP mechanism, e.g., as described below.

In some demonstrative aspects, system 100 may be configured to implement a Federated Authentication Service (FAS) mechanism, which may be configured to provide a technical solution to support IDPs 130 in joining the wireless communication roaming federation service 141, for example, in accordance with the WBA OpenRoaming framework, e.g., as described below.

In some demonstrative aspects, the FAS mechanism may be configured to provide a technical solution to support an IDP, e.g., substantially any IDP capable of user authentication, in joining the wireless communication roaming federation service 141, for example, in accordance with the WBA OpenRoaming framework, e.g., as described below.

In some demonstrative aspects, the FAS mechanism may be implemented by system 100 to provide a technical solution to allow many IDPs, e.g., substantially any IDP, which is capable of performing user authentication, to join the WBA OpenRoaming framework, e.g., as described below.

In some demonstrative aspects, the FAS mechanism may be implemented by system 100 to provide a technical solution to enable a huge pool of IDPs to potentially join the WBA OpenRoaming framework, and thereby to increase the scale to the WBA OpenRoaming framework.

In some demonstrative aspects, the FAS mechanism may be configured to provide a federated authentication mechanism, for example, where the 802.1x/EAP authentication may be abstracted within OpenRoaming framework, for example, while user authentication may be relayed to end point IDPs 130, for example, where needed, e.g., as described below.

In some demonstrative aspects, the FAS mechanism may be configured to provide an authentication solution, e.g., an 802.1x/EAP authentication solution, for example, for IDPs 130, which may be capable of user authentication.

In some demonstrative aspects, the FAS mechanism may be configured to provide a technical solution to support IDPs 130 to use their current user authentication solution, e.g., even if the IDPs 130 do not support the 802.1x/EAP authentication mechanism.

In some demonstrative aspects, the FAS mechanism may be configured to provide a technical solution to support IDPs 130 in joining the WBA OpenRoaming framework, e.g., even without requiring any substantial additional changes from the IDPs 130.

In some demonstrative aspects, the FAS may be hosted as part of the wireless communication roaming federation service 141, for example, as part of a WBA OpenRoaming cloud.

In other aspects, the FAS may be implemented as a separate, e.g., dedicated, service, and/or as part of any other additional or alternative service or framework.

In some demonstrative aspects, system 100 may include a FAS server 102, which may be configured to interface between the ANPs 160 and the IDPs 130, for example, for user authentication of the users of mobile devices 150, e.g., as described below.

In some demonstrative aspects, the FAS server 102 may be configured to provide a technical solution to support an IDP 130 in joining the WBA OpenRoaming framework, for example, even in case the IDP 130 does not support the 802.1x/EAP authentication mechanism, e.g., as described below.

In some demonstrative aspects, the FAS server 102 may be hosted as part of the wireless communication roaming federation service 141, for example, as part of a WBA OpenRoaming cloud.

In other aspects, the FAS server 102 may be implemented as a separate, e.g., dedicated, service, for example, as a separate cloud service, and/or as part of any other additional or alternative service or framework.

In some demonstrative aspects, FAS server 102 may include, for example, a processor 191, a memory unit 194, and/or a storage unit 195. The FAS server 102 may optionally include other suitable hardware components and/or software components. In some demonstrative aspects, some or all of the components of FAS server 102 may be enclosed in a common housing or packaging, and may be interconnected or operably associated using one or more wired or wireless links. In other aspects, components of one or more of FAS server 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of FAS server 102 and/or of one or more suitable applications.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a disk drive, a solid-state drive (SSD), and/or other suitable removable or non-removable storage units. Memory unit 194 and/or storage unit 195, for example, may store data processed by FAS server 102.

In some demonstrative aspects, FAS server 102 may include one or more communication interfaces 116 configured to communicate with IDPs 130, ANPs 160, elements of wireless communication roaming federation service 141, and/or any other additional or alternative element and/or device of system 100. For example, the one or more communication interfaces 116 may include one or more wireless communication interfaces, e.g., including one or more radios, to communicate over one or more wireless communication networks, and/or one or more wired communication interfaces to communicate over one or more wired networks.

In some demonstrative aspects, FAS server 102 may include a controller 124, which may be configured to perform and/or to trigger, cause, instruct and/or control FAS server 102 to perform one or more operations and/or communications, to generate and/or communicate one or more messages and/or transmissions, and/or to perform one or more functionalities, operations and/or procedures between FAS server 102 and one or more other devices and/or entities of system 100, e.g., as described below.

In some demonstrative aspects, controller 124 may include, or may be implemented, partially or entirely, by circuitry and/or logic, e.g., one or more processors including circuitry and/or logic, memory circuitry and/or logic, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a FAS server, e.g., FAS server 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, FAS server 102 may include a message processor 128 configured to generate, process and/or access one or messages communicated by FAS server 102.

In one example, message processor 128 may be configured to generate one or more messages to be transmitted by FAS server 102, and/or message processor 128 may be configured to access and/or to process one or more messages received by FAS server 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wired and/or wireless communication medium. In other aspects, message processor 128 may be configured to perform any other additional or alternative functionality and/or may include any other additional or alternative components to generate and/or process a message to be transmitted.

In some demonstrative aspects, message processor 128 may include, or may be implemented, partially or entirely, by circuitry and/or logic, e.g., one or more processors including circuitry and/or logic, memory circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of controller 124. In other aspects, the functionality of message processor 128 may be implemented as part of any other element of FAS server 102.

In some demonstrative aspects, FAS server 102 may include one or more authentication interfaces, which may be configured to perform one or more authentication procedures, for example, according to one or more authentication mechanisms and/or protocols, e.g., as described below.

In some demonstrative aspects, FAS server 102 may include at least one authentication interface 118, which may be configured to perform one or more authentication procedures, for example, according to one or more authentication mechanisms and/or protocols, which may be compatible with a network authentication mechanism, e.g., as described below.

In some demonstrative aspects, authentication interface 118 may be configured to perform one or more authentication procedures, for example, according to a network authentication mechanism of the wireless communication roaming federation service 141, e.g., as described below.

In some demonstrative aspects, authentication interface 118 may be configured to perform one or more authentication procedures, for example, according to an 802.1X/EAP authentication mechanism, e.g., as described below.

In some demonstrative aspects, authentication interface 118 may be configured to perform one or more authentication procedures of a WBA OpenRoaming network authentication mechanism, for example, of the WMA OpenRoaming framework, e.g., as described below.

In some demonstrative aspects, authentication interface 118 may be configured to perform one or more authentication procedures of an authentication interface between FAS server 102 and the ANPs 160, e.g., as described below.

In some demonstrative aspects, authentication interface 118 may be configured to perform one or more operations and/or functionalities of an 802.1x/EAP interface, e.g., with Remote Authentication Dial-In User Service (RADIUS) over Transport Layer Security (RADSec) support, for example, for WBA OpenRoaming network authentication, e.g., as described below.

In some demonstrative aspects, authentication interface 118 may be configured to perform one or more operations and/or functionalities of any other additional or alternative network authentication mechanism.

In some demonstrative aspects, FAS server 102 may include at least one authentication interface 119, which may be configured to perform one or more authentication procedures, for example, according to one or more authentication mechanisms and/or protocols, which may be compatible with an authentication mechanism supported by one or more IDPs 130, e.g., as described below.

In some demonstrative aspects, authentication interface 119 may be configured to relay and/or handle user authentication by the IDPs 130, e.g., as described below.

In some demonstrative aspects, authentication interface 119 may be configured to perform one or more authentication procedures, for example, of an authentication interface between FAS server 102 and one or more IDPs 130, e.g., as described below.

In some demonstrative aspects, authentication interface 119 may be configured to perform one or more authentication procedures, for example, according to an authentication protocol, which may be different from the network authentication protocol of the wireless communication roaming federation service 141, e.g., as described below.

In some demonstrative aspects, authentication interface 119 may be configured to perform one or more authentication procedures, for example, according to an authentication protocol, which may be different from the 802.1X/EAP authentication mechanism, e.g., as described below.

In some demonstrative aspects, authentication interface 119 may be configured to perform one or more authentication procedures, for example, of an Open authorization (oAuth) interface, e.g., as described below.

In some demonstrative aspects, authentication interface 119 may be configured to perform one or more authentication procedures, for example, of a Security assertion markup language (SAML) interface, e.g., as described below.

In some demonstrative aspects, the at least one authentication interface 119 may include a plurality of authentication interfaces configured according to a plurality of different authentication protocols, e.g., as described below.

In some demonstrative aspects, the at least one authentication interface 119 may include a first authentication interface 119 of a first authentication interface type, for example, to support an authentication protocol of a first IDP 130, e.g., as described below.

For example, FAS sever 102 may include an oAuth interface to support an oAuth authentication protocol of a first IDP 130, e.g., as described below.

In some demonstrative aspects, the at least one authentication interface 119 may include a second authentication interface 119 of a second authentication interface type, e.g., different from the first authentication interface type, for example, to support an authentication protocol of a second IDP 130, e.g., as described below.

For example, FAS sever 102 may include an SAML interface to support an SAML authentication protocol of a second IDP 130, e.g., as described below.

In some demonstrative aspects, authentication interface 119 may be configured to perform one or more operations and/or functionalities of any other additional or alternative authentication mechanism.

In some demonstrative aspects, controller 124 may be configured to control, trigger, cause, and/or instruct FAS server 102 to register the FAS server 102 with wireless communication roaming federation service 141, e.g., as described below.

In some demonstrative aspects, the wireless communication roaming federation service 141 may include a WBA OpenRoaming service, e.g., as described below. In other aspects, wireless communication roaming federation service 141 may include any other additional or alternative type of wireless communication roaming federation service.

In some demonstrative aspects, controller 124 may be configured to control, trigger, cause, and/or instruct FAS server 102 to authenticate a user of a mobile device 150 according to a network authentication protocol of the wireless communication roaming federation service 141, e.g., as described below.

In some demonstrative aspects, the network authentication protocol of the wireless communication roaming federation service 141 may be established over a RADSec tunnel 170 between the FAS server 102 and an ANP 130 associated with, and/or in communication with, the mobile device 150, e.g., as described below.

In some demonstrative aspects, the network authentication mechanism of the wireless communication roaming federation service 141 may be based, for example, on an EAP mechanism, e.g., as described below.

In some demonstrative aspects, the network authentication mechanism of the wireless communication roaming federation service 141 may include, for example, an Institute of Electrical and Electronics Engineers (IEEE) 802.1X Extensible Authentication Protocol (EAP) (802.1X/EAP) mechanism, e.g., as described below.

In other aspects, the network authentication mechanism of the wireless communication roaming federation service 141 may include, or may be based on, any other type of network authentication mechanism.

In some demonstrative aspects, controller 124 may be configured to control, trigger, cause, and/or instruct FAS server 102 to identify an IDP 130 for the user, for example, based on user information for the user, which may be received, for example, from the ANP 130 via the RADSec tunnel 170, e.g., as described below.

In some demonstrative aspects, the user information for the user may include, for example, Network Access Identifier (NAI) information for the user, e.g., as described below. In other aspects, controller 124 may be configured to control, trigger, cause, and/or instruct FAS server 102 to identify the IDP 130 for the user, for example, based on any other additional or alternative user information for the user.

In some demonstrative aspects, controller 124 may be configured to control, trigger, cause, and/or instruct FAS server 102 to trigger user authentication of the user with the IDP 130 for the user, for example, via an authentication interface 180 between the FAS server 102 and the IDP 130 for the user, e.g., as described below.

In some demonstrative aspects, the authentication interface 180 between the FAS server 102 and the IDP 130 for the user may be configured, for example, according to an authentication protocol, which may be different from the network authentication protocol of the wireless communication roaming federation service 141, e.g., as described below.

In some demonstrative aspects, the authentication interface 180 between the FAS server 102 and the IDP 130 for the user may include, for example, an oAuth interface, e.g., as described below.

In some demonstrative aspects, the authentication interface 180 between the FAS server 102 and the IDP 130 for the user may include, for example, an SAML interface, e.g., as described below.

In other aspects, the authentication interface 180 between the FAS server 102 and the IDP 130 for the user may include any other type of authentication interface, e.g., as described below.

In some demonstrative aspects, controller 124 may be configured to control, trigger, cause, and/or instruct FAS server 102 to send an authentication success message to the ANP 160, for example, via the RADSec tunnel 170, for example, based on a determination that the user is successfully authenticated with the IDP 130 for the user, e.g., as described below.

In some demonstrative aspects, controller 124 may be configured to control, trigger, cause, and/or instruct FAS server 102 to identify the IDP 130 for the user based, for example, on user-to-IDP (user-IDP) mapping information 193 to map between user information of a plurality of users and a plurality of IDPs 130, e.g., as described below.

In some demonstrative aspects, the user-IDP mapping information 193 may be configured to map user information of a particular user to a particular IDP 130 for the user, e.g., as described below.

In some demonstrative aspects, the user-IDP mapping information 193 may be stored in the storage 195 of FAS server 102, e.g., in al local storage and/or as part of a remote and/or cloud storage.

In some demonstrative aspects, controller 124 may be configured to control, trigger, cause, and/or instruct FAS server 102 to manage the user-IDP mapping information 193 on the storage 195 of the FAS server 102.

In some demonstrative aspects, controller 124 may be configured to control, trigger, cause, and/or instruct FAS server 102 to maintain the user-IDP mapping information 193, for example, in the form of a Lookup Table (LUT), e.g., as described below. In other aspects, the user-IDP mapping information 193 may be managed, stored, and/or retrieved according to any other additional or alternative memory/storge management mechanism.

In some demonstrative aspects, controller 124 may be configured to control, trigger, cause, and/or instruct FAS server 102 to authenticate a first user of a first mobile device 150 according to the network authentication mechanism of the wireless communication roaming federation service 141, for example, over a first RADSec tunnel 170 with a first ANP 160, e.g., as described below.

In some demonstrative aspects, controller 124 may be configured to control, trigger, cause, and/or instruct FAS server 102 to trigger user authentication of the first user with a first IDP 130 for the first user via a first authentication interface 180 between the FAS server 102 and the first IDP 130, e.g., as described below.

In some demonstrative aspects, controller 124 may be configured to control, trigger, cause, and/or instruct FAS server 102 to send a first authentication success message to the first ANP 160, for example, based on a determination that the first user is successfully authenticated with the first IDP 130, e.g., as described below.

In some demonstrative aspects, controller 124 may be configured to control, trigger, cause, and/or instruct FAS server 102 to authenticate a second user of a second mobile device 150 according to the network authentication mechanism of the wireless communication roaming federation service 141, for example, over a second RADSec tunnel 170 with a second ANP 160, e.g., as described below.

In some demonstrative aspects, controller 124 may be configured to control, trigger, cause, and/or instruct FAS server 102 to trigger user authentication of the second user with a second IDP 130 for the second user via a second authentication interface 180 between the FAS server 102 and the second IDP 130, e.g., as described below.

In some demonstrative aspects, controller 124 may be configured to control, trigger, cause, and/or instruct FAS server 102 to send a second authentication success message to the second ANP 160, for example, based on a determination that the second user is successfully authenticated with the second IDP 130, e.g., as described below.

In some demonstrative aspects, the first IDP 130 and the second IDP may be a same IDP 130. For example, controller 124 may be configured to control, trigger, cause, and/or instruct FAS server 102 to authenticate the first and second users with a same IDP 130, e.g., IDP 131.

In some demonstrative aspects, the first IDP 130 may be separate from the second IDP 130. For example, controller 124 may be configured to control, trigger, cause, and/or instruct FAS server 102 to authenticate the first user with a first IDP 130, e.g., IDP 131, and to authenticate the second user with a second IDP 130, e.g., IDP 133.

In some demonstrative aspects, the first ANP 160 and the second ANP 160 may be a same ANP 160. For example, controller 124 may be configured to control, trigger, cause, and/or instruct FAS server 102 to authenticate the first user and the second user via RADSec tunnels with a same ANP 160, e.g., ANP 161.

In some demonstrative aspects, the first ANP 160 may be separate from the second ANP 160. For example, controller 124 may be configured to control, trigger, cause, and/or instruct FAS server 102 to authenticate the first user via a RADSec tunnel with a first ANP 160, e.g., a RADSec tunnel 165 with ANP 161; and to authenticate the second user via a RADSec tunnel with a second, different, ANP 160, e.g., a RADSec tunnel 167 with ANP 163.

In some demonstrative aspects, the first authentication interface, e.g., between the FAS server 102 and the first IDP 130, and the second authentication interface, e.g., between the FAS server 102 and the second IDP 130, may be of a same authentication interface type. In one example, the first authentication interface and the second authentication interface may include an oAuth interface. In another example, the first authentication interface and the second authentication interface may include an SAML interface.

In some demonstrative aspects, a type of the first authentication interface, e.g., between the FAS server 102 and the first IDP 130, may be different from a type of the second authentication interface, e.g., between the FAS server 102 and the second IDP 130. For example, controller 124 may be configured to control, trigger, cause, and/or instruct FAS server 102 to utilize a first authentication interface 181, e.g., an oAuth interface, between the FAS server 102 and the first IDP, e.g., IDP 131, and to utilize a second authentication interface 183, e.g., an SAML interface, between the FAS server 102 and the second IDP, e.g., IDP 133.

In some demonstrative aspects, controller 124 may be configured to control, trigger, cause, and/or instruct FAS server 102 to register FAS server 102 with a Domain Name System (DNS) 171 of the wireless communication roaming federation service 141, e.g., as described below.

In some demonstrative aspects, the registration of the FAS server 102 with the DNS 171 of the wireless communication roaming federation service 141 may be configured to support discovery of the FAS server 102, e.g., by the ANPs 160.

In some demonstrative aspects, controller 124 may be configured to control, trigger, cause, and/or instruct FAS server 102 to process a request from the ANP 160 to authenticate the user, e.g., as described below.

In some demonstrative aspects, the request from the ANP 160 may address the FAS server 102, for example, based on registration of the FAS server 102 with the DNS server 171.

T In some demonstrative aspects, controller 124 may be configured to control, trigger, cause, and/or instruct FAS server 102 to maintain a certificate, which may be received from the wireless communication roaming federation service 141, for example, based on the registration of the FAS server 102 with the wireless communication roaming federation service 141, e.g., as described below.

In some demonstrative aspects, controller 124 may be configured to control, trigger, cause, and/or instruct FAS server 102 to establish the RADSec tunnel 170 with the ANP 160, for example, based on the certificate from the wireless communication roaming federation service 141, e.g., as described below.

Figure 2:
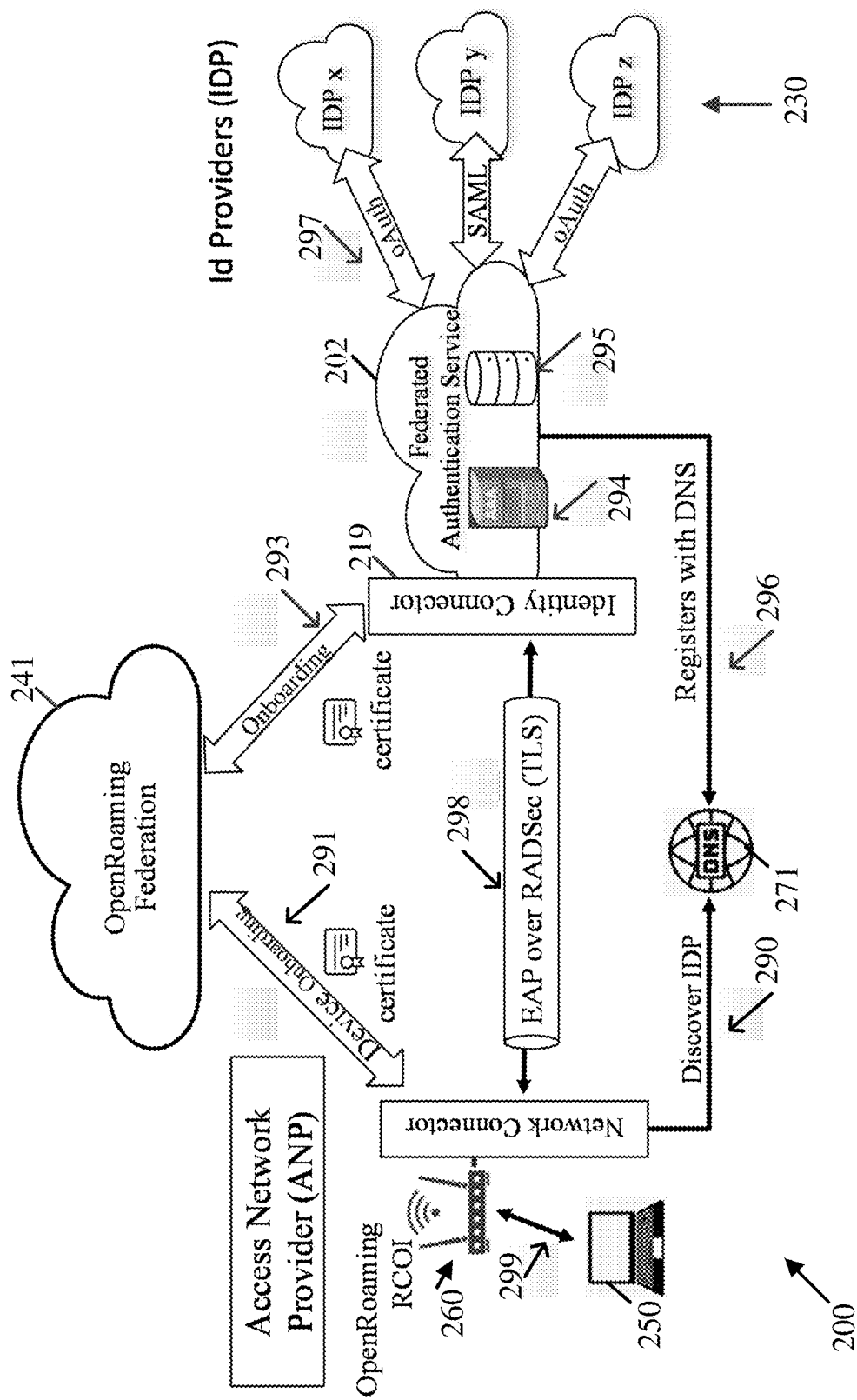
FIG. 2 is a schematic illustration of a deployment of a Federated Authentication Service (FAS) in a system according to a wireless communication roaming framework, in accordance with some demonstrative aspects.

Reference is made to FIG. 2, which schematically illustrates a deployment of a Federated Authentication Service (FAS) 202 in a system 200 according to a wireless communication roaming framework, in accordance with some demonstrative aspects.

In some demonstrative aspects, FAS server 102 (FIG. 1) may be configured to implement one or more elements of FAS 202, and/or to perform one or more functionalities of FAS 202.

In some demonstrative aspects, system 200 may be configured according to a WBA OpenRoaming framework, e.g., as described below. In other aspects, system 200 may be configured according to any other type of wireless roaming framework.

In some demonstrative aspects, system 200 may include a wireless communication roaming federation service, e.g., a WBA OpenRoaming federation service 241, which may be configured to support a global Wi-Fi network of Wi-Fi networks, for example, to support connection, e.g., automatic and/or secure connection, of a plurality of mobile devices 250.

In some demonstrative aspects, WBA OpenRoaming federation service 241 may be configured, e.g., in accordance with the WBA OpenRoaming service framework, to support global federation of public and/or private Wi-Fi networks and identity providers, for example, using WBA WRIX standards.

In some demonstrative aspects, system 200 may include one or more IDPs 230, which may be configured to authenticate end user identities of users of the mobile devices 250.

For example, an IDP 230 may be configured to authenticate an end user identity of a user of a mobile device 250, for example, as part of a connection establishment of a connection between the mobile device 250 and an access network controlled by an ANP 260.

In some demonstrative aspects, system 200 may be configured according to framework, e.g., the WBA OpenRoaming framework, which may be based on the PKI trust model, for example, where ANP and IDP participants may register and onboard with the WBA OpenRoaming federation service 241, for example, to get issued certificates for future verification and/or authentication.

In some demonstrative aspects, as indicated by arrow 291, ANP 260 may onboard and register with the WBA OpenRoaming federation service 241. For example, as indicated by arrow 291, ANP 260 may receive from the WBA OpenRoaming federation service 241 a certificate, which may be utilized by the ANP 260 to enable Wi-Fi networks of ANP 260 to receive many customers.

In some demonstrative aspects, FAS 202 may be configured to provide a technical solution to support onboarding of IDPs 230 with the WBA OpenRoaming federation service 241, for example, even in case that an IDP 230 is not compatible with authentication mechanisms utilized by the WBA OpenRoaming federation service 241, e.g., as described below.

In some demonstrative aspects, one or more elements and/or functionalities of FAS 202 may be implemented as a hosted FAS, which may be hosted within the WBA OpenRoaming federation service 241.

In other aspects, one or more elements and/or functionalities of FAS 202 may be implemented as a separate service, e.g., a separate cloud service, which may be independent of, and/or separate from, the WBA OpenRoaming federation service 241.

In some demonstrative aspects, system 200 may be configured to include one or many instances of FAS 202, which may be, for example, hosted and/or operated by the WBA OpenRoaming federation service 241.

In some demonstrative aspects, one or more third party service providers and/or brokers may be allowed to potentially implement a FAS mechanism, for example, within the WBA OpenRoaming framework.

In some demonstrative aspects, FAS 202 may be configured to implement an identity connector 219, which may be configured to support registration of the FAS 202 with the WBA OpenRoaming federation service 241. For example, as indicated by arrow 293, the FAS 202 may be configured to onboard with the WBA OpenRoaming federation service 241, for example, to obtain for the FAS 202 a certificate signed by the WBA OpenRoaming federation service 241.

In some demonstrative aspects, FAS 202 may be configured to implement DNS registration support. For example, as indicated by arrow 296, FAS 202 may be configured to register with a DNS 271, for example, to allow the FAS 202 to be discovered, e.g., by ANPs.

In some demonstrative aspects, FAS 202 may include an 802.1x/EAP interface with RADSec support, for example, to support WBA OpenRoaming network authentication. For example, as shown in FIG. 2, FAS 202 may be configured to authenticate a user of mobile device 250 according to an 802.1x/EAP network authentication protocol over a RADSec tunnel 298 between the FAS 202 and an ANP 260 associated with the mobile device 250. For example, FAS 202 may utilize an Authentication, Authorization and Accounting (AAA) server 294 to handle the 802.1x/EAP network authentication protocol over RADSec tunnel 298.

In some demonstrative aspects, FAS 202 may include one or more authentication interfaces 297 to support authentication with IDPs 230.

For example, FAS 202 may include an oAuth interface, an SAML interface, and/or any other suitable authentication interface, which may be configured to relay and/or handle user authentication by the IDPs 230.

In one example, some IDPs 230 may support a first type of authentication interface, e.g., the oAuth mechanism, while other IDPs 230 may support a second type of authentication interface, e.g., the SAML mechanism. Accordingly, FAS 202 may be configured to support a multiplicity of authentication interfaces 297.

In some demonstrative aspects, may maintain in a storage 295 user-IDP mapping information to map between user information of a plurality of users 250 and a plurality of IDPs 230, e.g., as described above.

In some demonstrative aspects, FAS 202 may be configured to maintain user-IDP mapping information in the form of a lookup table (LUT), which may be configured, for example, to match NAI Realm/User info to the end point IDPs 230 that will perform user authentication.

In some demonstrative aspects, as indicated by arrow 299 an OpenRoaming enabled mobile device 250 may attempt to connect to the OpenRoaming network, for example, by passing the NAI Realm of the IDP of the WBA OpenRoaming enabled mobile device 250 to an ANP 260.

In some demonstrative aspects, as indicated by arrow 290, the ANP 260 may perform a DNS lookup, for example, to query the DNS for 271 for the IDP of the OpenRoaming enabled mobile device 250.

In some demonstrative aspects, the ANP 260 may reach out to the FAS 202, for example, via the established RADSec tunnel 298.

In some demonstrative aspects, the FAS 202 may be configured to initiate an 802.1x/EAP authentication process with the mobile device 250, for example, to obtain user information of the user of mobile device 250, for example, via the RADSec tunnel 298.

In some demonstrative aspects, the FAS 202 may identify an IDP 230 for the user of mobile device 250, for example, by looking up the IDP according to the user-IDP mapping information, e.g., in storage 295.

In some demonstrative aspects, the FAS 202 may initiate a user authentication process to authenticate the user of mobile device 250 with the identified IDP 230 for the user. For example, the FAS 303 may trigger user authentication of the user with the IDP 230 for the user via a suitable authentication interface 297 between the FAS 202 and the IDP 230 for the user IDP, e.g., via an oAuth interface, an SAML interface, or any other authentication interface.

In some demonstrative aspects, FAS 202 may get back to the ANP 260 with the a success message, e.g., an EAP Success message, for example, based on successful of the user by the identified IDP 230 for the user. For example, FAS 202 may send the EAP Success message to the ANP 260 via the RADSec tunnel 298.

In some demonstrative aspects, the ANP 260 may open up a port and grant access to the mobile device 250, for example, based on receipt of the EAP Success message from FAS 202.

In some demonstrative aspects, the FAS 202 may be configured to provide a technical solution to support the onboarding of IDPs 230 onto the WBA OpenRoaming framework, e.g., substantially any IDP 230, which is capable of performing user authentication via an authentication interface supported by the FAS 202, e.g., oAuth, SAML, or the like.

In some demonstrative aspects, the FAS 202 may be configured to provide a technical solution to support the onboarding of IDPs 230 onto the WBA OpenRoaming framework, for example, even without requiring substantially any explicit change on IDPs 230.

some demonstrative aspects, the FAS 202 may be configured to provide a technical solution to support the onboarding of IDPs 230 onto the WBA OpenRoaming framework, for example, in a manner which may be transparent to ANPs 260 and, accordingly, may not require substantially any change on the ANPs 260.

some demonstrative aspects, the FAS 202 may be configured to provide a technical solution to support the onboarding of IDPs 230 onto the WBA OpenRoaming framework, for example, in a manner which may be transparent to mobile devices 250 and, accordingly, may not require substantially any change on the mobile devices 250.

Figure 3:
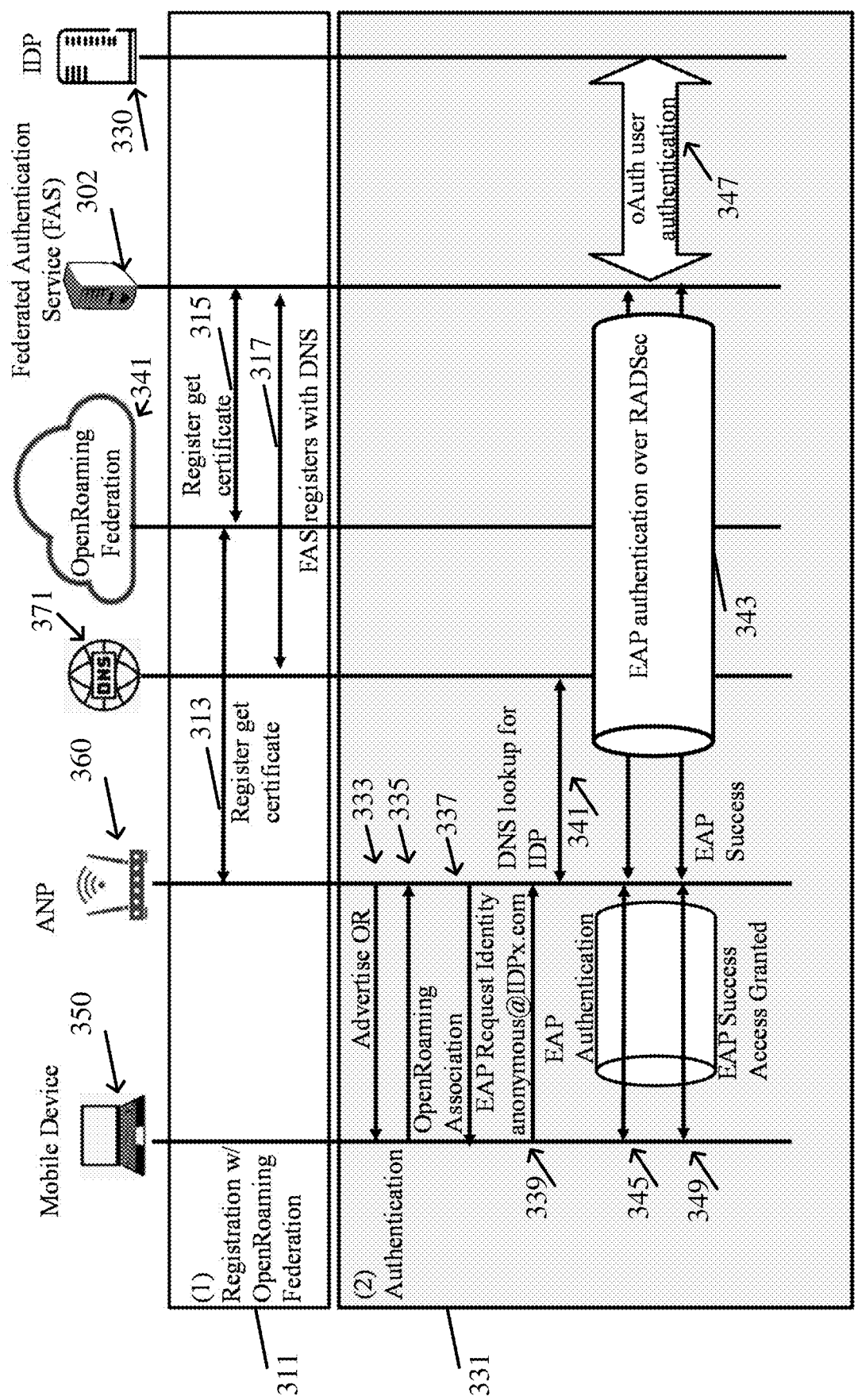
FIG. 3 is a schematic illustration of operations and communications of an authentication process implementing a FAS in a wireless communication roaming framework, in accordance with some demonstrative aspects.

Reference is made to FIG. 3, which schematically illustrates operations and communications of an authentication process implementing a FAS 302 in a wireless communication roaming framework, in accordance with some demonstrative aspects.

In some demonstrative aspects, FAS server 102 (FIG. 1) may be configured to implement one or more elements of FAS 302, and/or to perform one or more functionalities of FAS 302.

In some demonstrative aspects, FAS 302 may be configured according to a WBA OpenRoaming framework, e.g., as described below. In other aspects, FAS 302 may be configured according to any other type of wireless roaming framework.

In some demonstrative aspects, as indicated by arrow 313, an ANP 360 may register with a WBA OpenRoaming Federation 341, for example, during a registration and/or system "bring up" phase 311. For example, as indicated by arrow 313, ANP 360 may register with WBA OpenRoaming Federation 341, for example, to obtain a WBA OpenRoaming signed certificate for ANP 360.

In some demonstrative aspects, as indicated by arrow 315, FAS 302 may register with WBA OpenRoaming Federation 341, for example, during the registration and/or system "bring up" phase 311. For example, as indicated by arrow 315, FAS 302 may register with WBA OpenRoaming Federation 341, for example, to obtain a WBA OpenRoaming signed certificate for FAS 302.

In some demonstrative aspects, as indicated by arrow 317, FAS 302 may register with an OpenRoaming DNS 371.

In some demonstrative aspects, FAS 302 may be configured to support many IDPs, e.g., as described above. For example, the FAS 302 may be configured to manage user-to-IDP mapping information corresponding to the IDPs, e.g., by updating the IDPs that will be supported in an IDP table of the FAS 302, e.g., as described above. For example, the FAS 302 may be configured to implement the user-to-IDP mapping information to match IDPs with users, e.g., during user authentication.

In some demonstrative aspects, FAS 302 may be configured to participate in authentication of a user of a mobile device 350, for example, during an authentication phase 331, e.g., as described below.

In some demonstrative aspects, as indicated by arrow 333, an OpenRoaming AP associated with the ANP 360 may advertise an OpenRoaming Roaming Consortium Organization Identifier (RCOI), e.g., in beacons of the AP.

In some demonstrative aspects, as indicated by arrow 335, mobile device 350 may discover the OpenRoaming network and initiate an association/authentication process with ANP 360.

In some demonstrative aspects, as indicated by arrow 337, ANP 360 may send to the mobile device 350 a request for an EAP identity.

In some demonstrative aspects, as indicated by arrow 339, mobile device 350 may send to the ANP 360 an EAP Response including the EAP identity, e.g., an identity anoymousID@IDP_realm.com.

In some demonstrative aspects, as indicated by arrow 341, the ANP 360 may perform a DNS lookup with the DNS 371, for example, to obtain an IDP address, e.g., an address of FAS 302, e.g., as registered by FAS 302 with DNS 371 (arrow 317).

In some demonstrative aspects, as indicated by block 343, ANP 360 may establish a secure RADSec tunnel with the FAS 302.

In some demonstrative aspects, as indicated by arrow 345, FAS 302 may initiate an 802.1x/EAP authentication with the mobile device 350, for example, via an AAA server of FAS 302. For example, the FAS 302 may request user information, e.g., user ID/credential or the like corresponding to the user of mobile device 350, for example, via the RADSec tunnel.

In some demonstrative aspects, the FAS 302 may be configured to identify an end point authenticator IDP 330 for the user, for example, based on the user-to-IDP mapping information. For example, FAS 302 may identify the end point authenticator IDP 330 by matching the user/NAI info via a match within its IDP table.

In some demonstrative aspects, as indicated by arrow 347, FAS 302 may initiate an authentication of the user with the identified IDP 330, for example, via an authentication interface supported by the identified IDP 330, e.g., via an oAuth mechanism, an SAML mechanism, or the like. For example, FAS 302 may perform the authentication of the user with the identified IDP 330 by exchanging the user credentials.

In some demonstrative aspects, as indicated by arrow 349, FAS 302 may send a success message to the ANP 360 and the mobile device 350, for example, based on a successful authentication of the user by the IDP 330. For example, the AAA server of the FAS 302 may return an EAP success message to the mobile device 350 and the ANP 360.

In some demonstrative aspects, the ANP 360 may grant the mobile device 350 with access to Internet, for example, based on the EAP success message from FAS 302.

Figure 4:
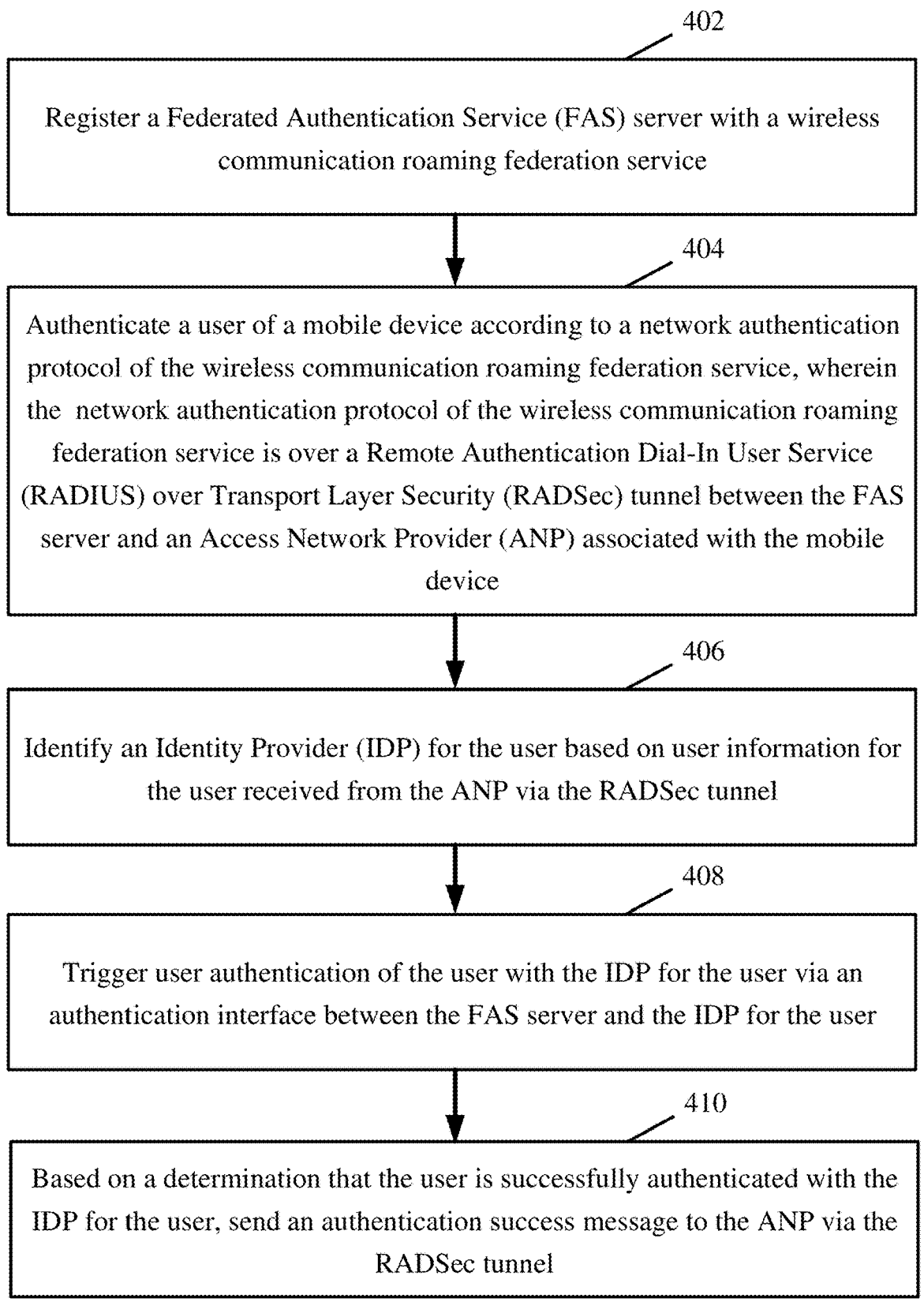
FIG. 4 is a schematic flow-chart illustration of a method of a FAS for wireless communication roaming, in accordance with some demonstrative aspects.

Reference is made to FIG. 4, which schematically illustrates a method of a FAS for wireless communication roaming, in accordance with some demonstrative aspects. For example, one or more of the operations of the method of FIG. 4 may be performed by one or more elements of a system, e.g., system 100 (FIG. 1), for example, one or more FAS, e.g., FAS 102 (FIG. 1), FAS 202 (FIG. 2), and/or FAS 302 (FIG. 3), a controller, e.g., controller 124 (FIG. 1), and/or a message processor, e.g., message processor 128 (FIG. 1).

As indicated at block 402, the method may include registering a FAS server with a wireless communication roaming federation service. For example, controller 124 (FIG. 1) may be configured to cause, trigger, and/or control FAS server 102 (FIG. 1) to register the FAS server 102 (FIG. 1) with a wireless communication roaming federation service 141 (FIG. 1), e.g., as described above.

As indicated at block 404, the method may include authenticating a user of a mobile device according to a network authentication protocol of the wireless communication roaming federation service. For example, the network authentication protocol of the wireless communication roaming federation service may be over a RADSec tunnel between the FAS server and an ANP associated with the mobile device. For example, controller 124 (FIG. 1) may be configured to cause, trigger, and/or control FAS server 102 (FIG. 1) to authenticate a user of a mobile device 150 (FIG. 1) according to a network authentication protocol of the wireless communication roaming federation service 141 (FIG. 1), for example, over RADSec tunnel 170 (FIG. 1) between the FAS server 102 (FIG. 1) and an ANP 160 (FIG. 1) associated with the mobile device 150 (FIG. 1), e.g., as described above.

As indicated at block 406, the method may include identifying an IDP for the user, for example, based on user information for the user received from the ANP via the RADSec tunnel. For example, controller 124 (FIG. 1) may be configured to cause, trigger, and/or control FAS server 102 (FIG. 1) to identify an IDP 130 (FIG. 1) for the user, for example, based on user information for the user received from the ANP 160 (FIG. 1) via the RADSec tunnel 170 (FIG. 1), e.g., as described above.

As indicated at block 408, the method may include triggering user authentication of the user with the IDP for the user, for example, via an authentication interface between the FAS server and the IDP for the user. For example, controller 124 (FIG. 1) may be configured to cause, trigger, and/or control FAS server 102 (FIG. 1) to trigger user authentication of the user with the IDP 130 (FIG. 1) for the user, for example, via an authentication interface between the FAS server 102 (FIG. 1) and the IDP 130 (FIG. 1) for the user, e.g., as described above.

As indicated at block 410, the method may include sending an authentication success message from the FAS server to the ANP via the RADSec tunnel, for example, based on a determination that the user is successfully authenticated with the IDP for the user. For example, controller 124 (FIG. 1) may be configured to cause, trigger, and/or control FAS server 102 (FIG. 1) to send an authentication success message to the ANP 160 (FIG. 1) via the RADSec tunnel 170 (FIG. 1), for example, based on a determination that the user is successfully authenticated with the IDP 130 (FIG. 1) for the user, e.g., as described above.

Figure 5:
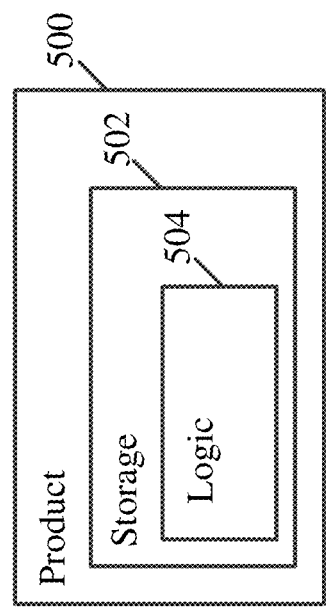
FIG. 5 is a schematic illustration of a product of manufacture, in accordance with some demonstrative aspects.

Reference is made to FIG. 5, which schematically illustrates a product of manufacture 500, in accordance with some demonstrative aspects. Product 500 may include one or more tangible computer-readable ("machine-readable") non-transitory storage media 502, which may include computer-executable instructions, e.g., implemented by logic 504, operable to, when executed by at least one computer processor, enable the at least one computer processor to implement one or more operations at FAS server 102 (FIG. 1), FAS 202 (FIG. 2), FAS 302 (FIG. 3), controller 124 (FIG. 1), and/or message processor 128 (FIG. 1); to cause FAS server 102 (FIG. 1), FAS 202 (FIG. 2), FAS 302 (FIG. 3), controller 124 (FIG. 1), and/or message processor 128 (FIG. 1) to perform, trigger and/or implement one or more operations and/or functionalities; and/or to perform, trigger and/or implement one or more operations and/or functionalities described with reference to the FIGS. 1-4, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 500 and/or machine readable storage media 502 may include one or more types of computer-readable storage media capable of storing data, including volatile memory, non-volatile memory, removable or non-removable memory, erasable or non-erasable memory, writeable or re-writeable memory, and the like. For example, machine readable storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a hard drive, an optical disk, a magnetic disk, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a Federated Authentication Service (FAS) server to register the FAS server with a wireless communication roaming federation service; authenticate a user of a mobile device according to a network authentication protocol of the wireless communication roaming federation service, wherein the network authentication protocol of the wireless communication roaming federation service is over a Remote Authentication Dial-In User Service (RADIUS) over Transport Layer Security (RADSec) tunnel between the FAS server and an Access Network Provider (ANP) associated with the mobile device; identify an Identity Provider (IDP) for the user based on user information for the user received from the ANP via the RADSec tunnel; trigger user authentication of the user with the IDP for the user via an authentication interface between the FAS server and the IDP for the user; and based on a determination that the user is successfully authenticated with the IDP for the user, send an authentication success message to the ANP via the RADSec tunnel.

Example 2 includes the subject matter of Example 1, and optionally, wherein the apparatus is configured to cause the FAS server to authenticate a first user of a first mobile device according to the network authentication mechanism of the wireless communication roaming federation service over a first RADSec tunnel with a first ANP, trigger user authentication of the first user with a first IDP for the first user via a first authentication interface between the FAS server and the first IDP, and, based on a determination that the first user is successfully authenticated with the first IDP, send a first authentication success message to the first ANP; and authenticate a second user of a second mobile device according to the network authentication mechanism of the wireless communication roaming federation service over a second RADSec tunnel with a second ANP, trigger user authentication of the second user with a second IDP for the second user via a second authentication interface between the FAS server and the second IDP, and, based on a determination that the second user is successfully authenticated with the second IDP, send a second authentication success message to the second ANP.

Example 3 includes the subject matter of Example 2, and optionally, wherein the first IDP and the second IDP are a same IDP.

Example 4 includes the subject matter of Example 2, and optionally, wherein the first IDP is separate from the second IDP.

Example 5 includes the subject matter of any one of Examples 2-4, and optionally, wherein the first ANP and the second ANP are a same ANP.

Example 6 includes the subject matter of any one of Examples 2-4, and optionally, wherein the first ANP is separate from the second ANP.

Example 7 includes the subject matter of any one of Examples 2-6, and optionally, wherein the first authentication interface and the second authentication interface are of a same authentication interface type.

Example 8 includes the subject matter of any one of Examples 2-6, and optionally, wherein a type of the first authentication interface is different from a type of the second authentication interface.

Example 9 includes the subject matter of any one of Examples 1-8, and optionally, wherein the apparatus is configured to cause the FAS server to identify the IDP for the user based on user-to-IDP (user-IDP) mapping information to map between user information of a plurality of users and a plurality of IDPs, wherein the user-IDP mapping information is configured to map user information of a particular user to a particular IDP for the user.

Example 10 includes the subject matter of Example 9, and optionally, wherein the apparatus is configured to cause the FAS server to manage the user-IDP mapping information on a storage of the FAS server.

Example 11 includes the subject matter of Example 9 or 10, and optionally, wherein the apparatus is configured to cause the FAS server to maintain the user-IDP mapping information in the form of a Lookup Table (LUT).

Example 12 includes the subject matter of any one of Examples 1-11, and optionally, wherein the apparatus is configured to cause the FAS server to register with a Domain Name System (DNS) of the wireless communication roaming federation service, and to process a request from the ANP to authenticate the user, wherein the request from the ANP addresses the FAS server based on registration of the FAS server with the DNS server.

Example 13 includes the subject matter of any one of Examples 1-12, and optionally, wherein the apparatus is configured to cause the FAS server to maintain a certificate received from the wireless communication roaming federation service based on registration of the FAS server with the wireless communication roaming federation service, and to establish the RADSec tunnel based on the certificate from the wireless communication roaming federation service.

Example 14 includes the subject matter of any one of Examples 1-13, and optionally, wherein the wireless communication roaming federation service comprises a Wireless Broadband Alliance (WBA) OpenRoaming service.

Example 15 includes the subject matter of any one of Examples 1-14, and optionally, wherein the user information for the user comprises Network Access Identifier (NAI) information for the user.

Example 16 includes the subject matter of any one of Examples 1-15, and optionally, wherein the network authentication mechanism of the wireless communication roaming federation service is based on an Extensible Authentication Protocol (EAP) mechanism.

Example 17 includes the subject matter of any one of Examples 1-16, and optionally, wherein the network authentication mechanism of the wireless communication roaming federation service comprises an Institute of Electrical and Electronics Engineers (IEEE) 802.1X Extensible Authentication Protocol (EAP) (802.1X/EAP) mechanism.

Example 18 includes the subject matter of any one of Examples 1-17, and optionally, wherein the authentication interface between the FAS server and the IDP for the user comprises an Open Authorization (oAuth) interface.

Example 19 includes the subject matter of any one of Examples 1-18, and optionally, wherein the authentication interface between the FAS server and the IDP for the user comprises a Security Assertion Markup Language (SAML) interface.

Example 20 includes the subject matter of any one of Examples 1-19, and optionally, wherein the authentication interface between the FAS server and the IDP for the user is according to an authentication protocol different from the network authentication protocol of the wireless communication roaming federation service.

Example 21 includes the subject matter of any one of Examples 1-20, and optionally, comprising at least one communication interface to communicate with the ANP and the IDP for the user.

Example 22 includes the subject matter of Example 21, and optionally, comprising a processor to execute instructions of an operating system of the FAS server.

Example 23 comprises a device comprising the apparatus of any of Examples 1-22.

Example 24 comprises a server comprising the apparatus of any of Examples 1-22.

Example 25 comprises an apparatus comprising means for executing any of the described operations of any of Examples 1-22.

Example 26 comprises a product comprising one or more tangible computer-readable non-transitory storage media comprising computer-executable instructions operable to, when executed by at least one processor, enable the at least one processor to cause any of the described operations of any of Examples 1-22.

Example 27 comprises an apparatus comprising: a memory interface; and processing circuitry configured to: perform any of the described operations of any of Examples 1-22.

Example 28 comprises a method comprising any of the described operations of any of Examples 1-22.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a Federated Authentication Service (FAS) server to:
   register the FAS server with a wireless communication roaming federation service;
   authenticate a user of a mobile device according to a network authentication protocol of the wireless communication roaming federation service, wherein the network authentication protocol of the wireless communication roaming federation service is over a Remote Authentication Dial-In User Service (RADIUS) over Transport Layer Security (RADSec) tunnel between the FAS server and an Access Network Provider (ANP) associated with the mobile device;
   identify an Identity Provider (IDP) for the user based on user information for the user received from the ANP via the RADSec tunnel;
   communicate with the IDP for the user via an authentication interface between the FAS server and the IDP for the user to trigger user authentication of the user with the IDP for the user; and
   based on a determination at the FAS server that the user is successfully authenticated with the IDP for the user, send an authentication success message to the ANP via the RADSec tunnel.

2. The apparatus of claim 1 configured to cause the FAS server to:
   authenticate a first user of a first mobile device according to the network authentication protocol of the wireless communication roaming federation service over a first RADSec tunnel with a first ANP, communicate with a first IDP for the first user via a first authentication interface between the FAS server and the first IDP for the first user to trigger user authentication of the first user with the first IDP for the first user, and, based on a determination at the FAS server that the first user is successfully authenticated with the first IDP for the first user, send a first authentication success message to the first ANP; and
   authenticate a second user of a second mobile device according to the network authentication protocol of the wireless communication roaming federation service over a second RADSec tunnel with a second ANP, communicate with a second IDP for the second user via a second authentication interface between the FAS server and the second IDP for the second user to trigger user authentication of the second user with the second IDP for the second user, and, based on a determination at the FAS server that the second user is successfully authenticated with the second IDP for the second user, send a second authentication success message to the second ANP.

3. The apparatus of claim 2, wherein the first IDP and the second IDP are a same IDP.

4. The apparatus of claim 2, wherein the first IDP is separate from the second IDP.

5. The apparatus of claim 2, wherein the first ANP and the second ANP are a same ANP.

6. The apparatus of claim 2, wherein the first ANP is separate from the second ANP.

7. The apparatus of claim 2, wherein the first authentication interface and the second authentication interface are of a same authentication interface type.

8. The apparatus of claim 2, wherein a type of the first authentication interface is different from a type of the second authentication interface.

9. The apparatus of claim 1 configured to cause the FAS server to identify the IDP for the user based on user-to-IDP (user-IDP) mapping information to map between user information of a plurality of users and a plurality of IDPs, wherein the user-IDP mapping information is configured to map user information of a particular user to a particular IDP for the particular user.

10. The apparatus of claim 9 configured to cause the FAS server to manage the user-IDP mapping information on a storage of the FAS server.

11. The apparatus of claim 9 configured to cause the FAS server to maintain the user-IDP mapping information in the form of a Lookup Table (LUT).

12. The apparatus of claim 1 configured to cause the FAS server to register with a Domain Name System (DNS) server of the wireless communication roaming federation service, and to process a request from the ANP to authenticate the user, wherein the request from the ANP addresses the FAS server based on registration of the FAS server with the DNS server.

13. The apparatus of claim 1 configured to cause the FAS server to maintain a certificate received from the wireless communication roaming federation service based on registration of the FAS server with the wireless communication roaming federation service, and to establish the RADSec tunnel based on the certificate from the wireless communication roaming federation service.

14. The apparatus of claim 1, wherein the wireless communication roaming federation service comprises a Wireless Broadband Alliance (WBA) OpenRoaming service.

15. The apparatus of claim 1, wherein the user information for the user comprises Network Access Identifier (NAI) information for the user.

16. The apparatus of claim 1, wherein the network authentication protocol of the wireless communication roaming federation service is based on an Extensible Authentication Protocol (EAP) mechanism.

17. The apparatus of claim 1, wherein the network authentication protocol of the wireless communication roaming federation service comprises an Institute of Electrical and Electronics Engineers (IEEE) 802.1X Extensible Authentication Protocol (EAP) (802.1X/EAP) mechanism.

18. The apparatus of claim 1, wherein the authentication interface between the FAS server and the IDP for the user comprises an Open Authorization (oAuth) interface.

19. The apparatus of claim 1, wherein the authentication interface between the FAS server and the IDP for the user comprises a Security Assertion Markup Language (SAML) interface.

20. The apparatus of claim 1, wherein the authentication interface between the FAS server and the IDP for the user is according to an authentication protocol different from the network authentication protocol of the wireless communication roaming federation service.

21. The apparatus of claim 1 comprising at least one communication interface to communicate with the ANP and the IDP for the user.

22. A product comprising one or more tangible computer-readable non-transitory storage media comprising instructions operable to, when executed by at least one processor, enable the at least one processor to cause a Federated Authentication Service (FAS) server to:
- register the FAS server with a wireless communication roaming federation service;
- authenticate a user of a mobile device according to a network authentication protocol of the wireless communication roaming federation service, wherein the network authentication protocol of the wireless communication roaming federation service is over a Remote Authentication Dial-In User Service (RADIUS) over Transport Layer Security (RADSec) tunnel between the FAS server and an Access Network Provider (ANP) associated with the mobile device;
- identify an Identity Provider (IDP) for the user based on user information for the user received from the ANP via the RADSec tunnel;
- communicate with the IDP for the user via an authentication interface between the FAS server and the IDP for the user to trigger user authentication of the user with the IDP for the user; and
- based on a determination at the FAS server that the user is successfully authenticated with the IDP for the user, send an authentication success message to the ANP via the RADSec tunnel.

23. The product of claim 22, wherein the instructions, when executed, cause the FAS server to identify the IDP for the user based on user-to-IDP (user-IDP) mapping information to map between user information of a plurality of users and a plurality of IDPs, wherein the user-IDP mapping information is configured to map user information of a particular user to a particular IDP for the particular user.

24. An apparatus for a Federated Authentication Service (FAS) server, the apparatus comprising:
- means for registering the FAS server with a wireless communication roaming federation service;
- means for authenticating a user of a mobile device according to a network authentication protocol of the wireless communication roaming federation service, wherein the network authentication protocol of the wireless communication roaming federation service is over a Remote Authentication Dial-In User Service (RADIUS) over Transport Layer Security (RADSec) tunnel between the FAS server and an Access Network Provider (ANP) associated with the mobile device;
- means for identifying an Identity Provider (IDP) for the user based on user information for the user received from the ANP via the RADSec tunnel;
- means for causing the FAS server to communicate with the IDP for the user via an authentication interface between the FAS server and the IDP for the user to trigger user authentication of the user with the IDP for the user; and
- means for, based on a determination at the FAS server that the user is successfully authenticated with the IDP for the user, causing the FAS server to send an authentication success message to the ANP via the RADSec tunnel.

25. The apparatus of claim 24 comprising means for causing the FAS server to:
- authenticate a first user of a first mobile device according to the network authentication protocol of the wireless communication roaming federation service over a first RADSec tunnel with a first ANP, communicate with a first IDP for the first user via a first authentication interface between the FAS server and the first IDP for the first user to trigger user authentication of the first user with the first IDP for the first user, and, based on a determination at the FAS server that the first user is successfully authenticated with the first IDP for the first user, send a first authentication success message to the first ANP; and
- authenticate a second user of a second mobile device according to the network authentication protocol of the wireless communication roaming federation service over a second RADSec tunnel with a second ANP, communicate with a second IDP for the second user via a second authentication interface between the FAS server and the second IDP for the second user to trigger user authentication of the second user with the second IDP for the second user, and, based on a determination at the FAS server that the second user is successfully authenticated with the second IDP for the second user, send a second authentication success message to the second ANP.

* * * * *